United States Patent
Aldrey et al.

(10) Patent No.: US 9,900,557 B2
(45) Date of Patent: Feb. 20, 2018

(54) METHOD AND APPARATUS FOR REMOTE SET-TOP BOX MANAGEMENT

(75) Inventors: Raul Aldrey, Dallas, TX (US); Abhishek Gupta, Dallas, TX (US); Anil Solleti, Irving, TX (US); Enrique Ruiz Velasco Fonseca, Flower Mound, TX (US); Laxmi Patel, Irving, TX (US); Pericharla Anjaneya, Irving, TX (US); Sudeep Dasgupta, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 2171 days.

(21) Appl. No.: 11/966,652

(22) Filed: Dec. 28, 2007

(65) Prior Publication Data

US 2009/0172757 A1 Jul. 2, 2009

(51) Int. Cl.
*H04N 7/173* (2011.01)
*H04N 7/16* (2011.01)
*H04N 21/258* (2011.01)
*H04N 21/4227* (2011.01)
*H04N 21/485* (2011.01)
*H04N 21/6547* (2011.01)

(52) U.S. Cl.
CPC ............. *H04N 7/165* (2013.01); *H04N 7/173* (2013.01); *H04N 21/25808* (2013.01); *H04N 21/4227* (2013.01); *H04N 21/485* (2013.01); *H04N 21/6547* (2013.01)

(58) Field of Classification Search
USPC .................................................. 725/58, 109
See application file for complete search history.

(56) References Cited

U.S. PATENT DOCUMENTS

| | | | | |
|---|---|---|---|---|
| 6,922,843 B1 * | 7/2005 | Herrington | ............ | H04N 7/163 348/E7.061 |
| 7,305,697 B2 * | 12/2007 | Alao | .................... | H04N 21/812 348/E7.07 |
| 7,484,246 B2 * | 1/2009 | Matsuyama | ............ | G06F 21/10 726/27 |
| 8,299,889 B2 * | 10/2012 | Kumar | ............... | G06K 9/00885 340/13.24 |
| 8,955,085 B2 * | 2/2015 | Suzuki | .................. | H04L 63/083 380/270 |
| 2002/0059621 A1 * | 5/2002 | Thomas | ................ | G06F 3/0481 725/87 |
| 2002/0174430 A1 * | 11/2002 | Ellis | ...................... | G11B 27/005 725/46 |
| 2003/0005446 A1 * | 1/2003 | Jaff | ..................... | H04N 7/17318 725/51 |
| 2003/0014546 A1 * | 1/2003 | Kikinis | .................. | H04N 7/163 709/250 |
| 2004/0255118 A1 * | 12/2004 | Shin | ........................ | H04L 63/08 713/168 |
| 2005/0028208 A1 * | 2/2005 | Ellis | ...................... | H04N 7/163 725/58 |
| 2006/0064720 A1 * | 3/2006 | Istvan | ................ | H04N 5/44543 725/38 |
| 2006/0236352 A1 * | 10/2006 | Scott, III | ................. | H04N 5/76 725/89 |

(Continued)

*Primary Examiner* — Jonathan V Lewis

(57) ABSTRACT

An approach is provided for remotely controlling set-top boxes. A command is received from a computing device for controlling a plurality of set-top boxes. The set-top boxes are configured according to the received command.

29 Claims, 7 Drawing Sheets

(56) References Cited

U.S. PATENT DOCUMENTS

| | | | |
|---|---|---|---|
| 2006/0259965 A1* | 11/2006 | Chen | H04L 9/3226 |
| | | | 726/20 |
| 2006/0271695 A1* | 11/2006 | Lavian | G06F 21/552 |
| | | | 709/229 |
| 2007/0011709 A1* | 1/2007 | Katz | H04N 7/17318 |
| | | | 725/87 |
| 2008/0191009 A1* | 8/2008 | Gressel | G06Q 10/02 |
| | | | 235/382 |
| 2010/0023962 A1* | 1/2010 | Blommaert | H04L 63/0815 |
| | | | 725/31 |
| 2010/0095337 A1* | 4/2010 | Dua | H04L 29/06027 |
| | | | 725/110 |

\* cited by examiner

METHOD AND APPARATUS FOR REMOTE SET-TOP BOX MANAGEMENT

BACKGROUND INFORMATION

With the advent of computers, interactive electronic communications, and the Internet, as well as advances in the digital realm of consumer information, has come a reinvention of conventional entertainment and communication services to enhance programming, recording, and viewing of multimedia, such as broadcast television programs. In this manner, service providers are increasing the wealth of available features, not to mention creating endless opportunities for personalized configurations. However, developments in user interface technology have not kept pace with the explosion of digital entertainment, nor have they remained in harmony with the itinerant nature of modern lifestyles. As such, the entertainment value of television is being greatly diminished by antiquated control techniques (namely panel controls or handheld remote controllers), neither satisfying in their design, nor efficient in their implementation.

Therefore, there is a need for an approach that seamlessly provides efficient, convenient access to system controls and configurations.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and software for remote services management are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to a set-top box (STB), it is contemplated that these embodiments have applicability to any device capable of processing audio-video (AV) signals for presentation to a user, such as a home communication terminal (HCT), a digital home communication terminal (DHCT), a stand-alone personal video recorder (PVR), a television set, a digital video disc (DVD) player, a video-enabled phone, an AV-enabled personal digital assistant (PDA), and/or a personal computer (PC), as well as other like technologies and customer premises equipment (CPE).

Figure 1:
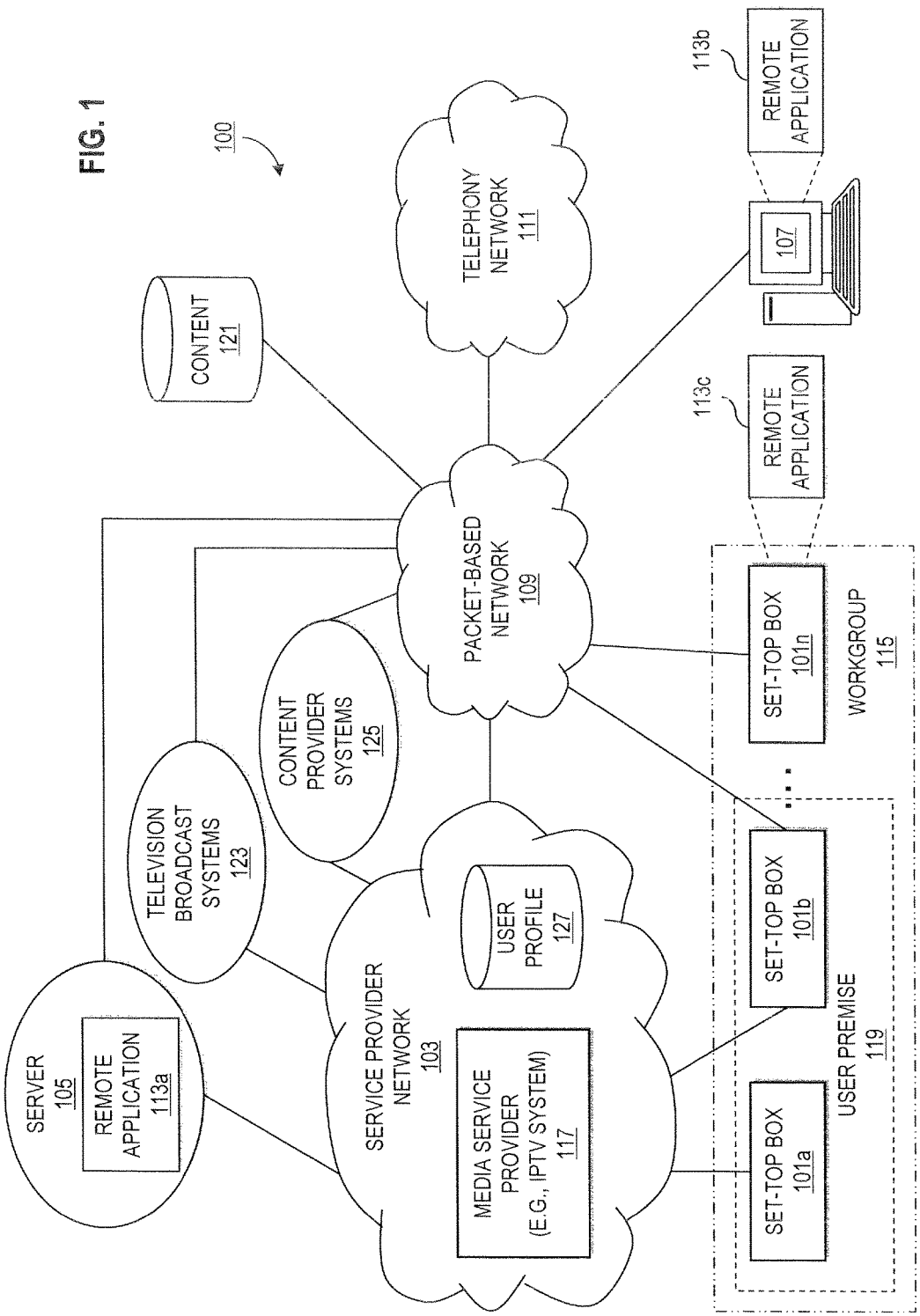
FIG. 1 is a diagram of a system capable of providing remote set-top box management, according to an exemplary embodiment.

FIG. 1 is a diagram of a system capable of providing remote set-top box management, according to an exemplary embodiment. For the purposes of illustration, a system 100 for configuring multiple media-based devices 101*a*-101*n*, e.g., STBs, is described with respect to a service provider network 103. As used herein, the terms media-based device, STB, and user equipment are interchangeable. It is recognized that service providers need to be mindful of consumer demand for omnipresent control over the entertainment experience. Accordingly, system 100 introduces a remote access management capability for these STBs 101*a*-101*n*, thereby affording substantial convenience and flexibility in experiencing content by consumers. In other words, the remote access management service of system 100, according to certain embodiments, stems from the recognition that consumers can benefit from more flexible methods of accessing and controlling one or more media-based devices. However, little attention has been afforded to extending and enhancing user interface technology within the entertainment arena, as well as among other communication mediums. Thus, it is apparent that improvements are needed to provide individuals with the dynamic ability to manage their media experience with easy-to-use tools, but without geographic or time limitations.

Service provider network 103 includes a server 105 that implements a real-time, remote management service, whereby users can remotely access and configure one or more STBs 101*a*-101*n* and/or manipulate account settings. Namely, the remote management service provides subscribers ubiquitous control over subscription service parameters (e.g., packages, channels, personal information, available equipment, etc.) and STB configurations (e.g., parental controls, available channels, favorite channels, DVR settings, viewing history, loaded software, etc.) at substantially any moment in time, from various locations. In this manner, a remotely located subscriber, such as an individual at work, can monitor and control content availability, create channel offerings, manipulate recording features, order "on-demand" content, and/or modify personalization options, as well as influence other suitably controllable features of one or more STBs 101*a*-101*n* located at, for instance, another location, such as their home. It is contemplated that system 100 may embody many forms and include multiple and/or alternative components and facilities.

It is observed that television remains the prevalent global medium for entertainment and information as individuals spend a great deal of time tuning into televised media. As such, television services provided over a dedicated network, such as an Internet Protocol television (IPTV) network, cable network, or satellite network, extend to subscribers an overwhelming choice of programming options and configurations. For example, IPTV service providers offer consumers various AV services ranging from multi-channel AV programming that mimics traditional broadcast media, to true "on-demand" programming. These services are further supplemented with interactive AV applications that enable robust programming information, selection and navigation functionality, as well as integrated digital AV recording, and other data services to enhance the AV experience. As such, television is no longer a passive medium; it is an interactive entertainment encounter capable of endless configuration and personalization.

Traditionally, in order to set-up a media-based device, such as an STB, consumers have been generally limited to directly programming the apparatus using an on-board control panel or manipulating a short-range remote controller in communication with the device. While these conventional techniques may, at times, be suitable for those situations when the user is physically located within the vicinity of the device (e.g., within the same room), they do not address situations when a user is remotely located beyond the short distance confines of the controller's communicative medium, i.e., infrared or radio signal. Furthermore, beyond basic channel surfing and standardized viewing functionality, conventional input methodology does not scale well to the increasing complexity of input commands.

As mentioned, the consumer segment is driven, at least in part, by a pervasive desire for real-time, remote management services extended through easily manipulated, intuitive interfaces. In part, this is a consequence of consumers becoming accustomed to the user friendliness and remote access ubiquity of the Internet made possible through a combination of wired and wireless infrastructures. Advances in connectivity (e.g., broadband access) and dynamic software have stimulated the growing complexity of services capable of being offered without geographic or time constraints.

As seen in FIG. 1, service provider network 103 integrates the television medium with that of the telecommunications, computing, and media environments, thereby broadening the scope of devices available to consumers for remote interaction with STBs 101a-101n. In this manner, system 100 relieves STBs users from having to be physically located at (or near) the media-based devices to configure them, by enabling those (or other) users via one or more end terminals (e.g., end terminal 107) or with an STB (e.g., STB 101n), to remotely access and control STBs 101a-101n over, for instance, one or more data networks (e.g., packet-based network 109 and/or telephony network 111). Further, system 100 relieves network operators from the burden and expense of providing parallel avenues to control user equipment (e.g., STBs 101a-101n) from remote locations.

In a typical scenario, an individual (e.g., subscriber of the remote management service) may, via a client-user interface (such as a web-based application 113a implemented on server 105, a computing application 113b executed on, for instance, a PC, or a media based application 113c operating on, for example, STB 101n), access one or more media based devices (e.g., STBs 101a-101n) logically associated with one another in, for example, a workgroup 115, so as to control, configure, or otherwise program STBs 101a-101n in real-time from an "online" or "networked" session. Namely, subscribers are presented with an integrated presentation that includes controllable parameters governing information stored on STBs 101a-101n, media content originating from a media service provider (MSP) 117 or a third-party source, as well as options relating to subscription services. In other words, an individual may generate a command for controlling a plurality of STBs 101a-101n, and transmit that command to the STBs 101a-101n to configure the devices 101a-101n. As such, subscribers are no longer limited to configuring an STB "from the same room," but instead may access the media-based device, and associated subscription service, from a remote location. In particular embodiments, STBs 101a-101n may be associated with one or more subscribers, may be located in one or more user premises (e.g., user premise 119), and/or may be situated in different physical locations, but nevertheless, can be configured at once, from substantially anywhere, utilizing one or more end terminals 107 (or STBs) having connectivity to system 100.

A remote application (e.g., remote application 113a) permits users to easily, effectively, and intuitively convey control commands for configuring a plurality of STBs 101a-101n, wherein the control commands affect configuration data relating to such parameters as parental controls, available channel information, favorite channels specified by the user, program recording settings, viewing history, and/or software loaded in the respective STBs 101a-101n, as well as other suitable control parameters. In certain embodiments, one or more remote applications 113a-113c may enable subscribers to manipulate recording functions of one or more STBs 101a-101n, wherein a control command specifies a list of content to be recorded by one or more of the devices 101a-101n. In other embodiments, a control command can specify an on-demand content selection, such as a video-on-demand (VOD) or audio-on-demand (AOD) selection. In addition, the remote applications 113a-113n may enable users to manage subscription services or personalized settings for the STBs 101a-101n. Furthermore, the remote applications 113a-113c may enable users to make content available at one or more STBs 101a-101n, such as content retrieved over a data network, e.g., stored at content repository 121. As such, embodiments of service provider network 103 may also enable individuals utilizing STBs 101a-101n (or end terminal(s) 107) to interact with one another, through personalized communications channels, to further facilitate the processes described herein.

Media content can include any AV content (e.g., broadcast television programs, VOD programs, AOD programs, pay-per-view programs, IPTV feeds, DVD related content, etc.), pre-recorded media content, data communication services content (e.g., commercials, advertisements, videos, movies, songs, images, sounds, etc.), Internet services content (streamed audio, video, or pictographic media), and/or any other equivalent media form. In this manner, an MSP 117 may provide (in addition to their own media content) content obtained from sources, such as one or more television broadcast systems 123, one or more third-party content provider systems 125, content residing in a repository 121, accessible via server 105, or otherwise available via one or more packet-based networks 109 or telephony networks 111, etc.

In particular embodiments, MSP 117 may comprise an IPTV system configured to support the transmission of television video programs from the broadcast systems 123 as well as other content, such as media content from the various third-party sources (e.g., 101a-101n, 107, 121, 125) utilizing Internet Protocol (IP). That is, the IPTV system 117 may deliver signals and/or streams, including media content and control commands, in the form of IP packets. Further, the transmission network (e.g., service provider network 103) may optionally support end-to-end data encryption in conjunction with the streaming and remote management services, as previously mentioned.

In this manner, the use of IP permits television services to be integrated with broadband Internet services, and thus, share common connections to a user site. Also, IP packets can be more readily manipulated, and therefore, provide users with greater flexibility in terms of control, as well as offer superior methods for increasing the availability of media content. Delivery of AV content and/or control commands, by way of example, may be through a multicast from the IPTV system 117 to the STBs 101a-101n. Any individual STB may tune to a particular source by simply joining a multicast (or unicast) of the media content or control command, utilizing an IP group membership protocol (IGMP). For instance, the IGMP v2 protocol may be employed for joining STBs to new multicast (or unicast) groups. Such a manner of delivery avoids the need for expensive tuners to view media content, such as television broadcasts; however, other delivery methods, such as directly modulated carriers (e.g., national television systems committee (NTSC), advanced television systems committee (ATSC), quadrature amplitude modulation (QAM)), may still be utilized. Further, this delivery method also enables varied levels of control, i.e., control over single STBs or broadcast control commands affecting multiple STBs. It is noted that conventional delivery methods may also be implemented and combined with the advanced methods of system 100. Further, the media content (and subsequently the control commands) may be provided to various IP-enabled devices, such as the computing, telephony, and mobile apparatuses delineated below.

An STB (e.g., STB 101a) may integrate all the functions of an IPTV system, as well as combine the media content and control functions of the various online or off-line environments, in a manner that seamlessly toggles among the various system 100 resources. It is contemplated that the remote service may be extended to users with a presence on the Internet. In alternative embodiments, the services of system 100 could be extended to users having an end terminal (not illustrated), such as a plain old telephone service (POTS) device, connected to the telephony network 111.

Accordingly, MSP 117 can provide media content that is retrieved over a data network, as well as provide conventional media streams. For instance, MSP 117 provides STBs 101a-101n access to content traditionally limited to host sites, such as end user originated content uploaded to audio, video, and/or pictographic sharing sites. The media content may also be shared between STBs 101a-101n, as well as between STBs 101a-101n and end terminal(s) 107. It is generally noted that media content can be any type of information provided from any source having connectivity to system 100.

In this manner, remote applications 113b and 113c may be executable, for example, as a user interface capable of local implementation on an STB (e.g., STB 101a-101n) or on an end terminal 107, such as a computer, telephony device, mobile device, or other like mechanism. Thus, exemplary embodiments of remote applications 113a and 113b may be provided through navigation shell applications, e.g., menu applications having options corresponding to different functions. Accordingly, computer devices may include desktop computers, notebook computers, servers, terminal workstations, gaming systems, customized hardware, or other equivalent apparatus. Telephony devices may comprise plain-old-telephones, wireless telephones, cellular telephones, satellite telephones, voice over internet protocol telephones, and the like. Mobile devices may include personal digital assistants (PDA), pocket personal computers, smart phones, tablets, handsets, portable gaming systems, and customized hardware, as well as other mobile technologies capable transmitting data. Moreover, STBs 101a-101n may be used alone or in combination with one or more end terminal(s) 107 to implement various exemplary embodiments.

The STBs 101a-101n and/or end terminal(s) 107 can communicate using the packet-based network 109 and/or the telephony network 109. These systems can include: a public data network (e.g., the Internet), various intranets, local area networks (LAN), wide area networks (WAN), the public switched telephony network (PSTN), integrated services digital networks (ISDN), other private packet switched networks or telephony networks, as well as any additional equivalent system or combination thereof. These networks may employ various access technologies including cable networks, satellite networks, subscriber television networks, digital subscriber line (DSL) networks, optical fiber networks, hybrid fiber-coax networks, worldwide interoperability for microwave access (WiMAX) networks, wireless fidelity (WiFi) networks, other wireless networks (e.g., 3G wireless broadband networks, mobile television networks, radio networks, etc.), terrestrial broadcasting networks, provider specific networks (e.g., a Verizon® FiOS network, a TiVo network, etc), and the like. Such networks may also utilize any suitable protocol supportive of data communications, e.g., transmission control protocol (TCP), internet protocol (IP), user datagram protocol (UDP), hypertext markup language (HTML), dynamic HTML (DHTML), file transfer protocol (FTP), telnet, hypertext transfer protocol (HTTP), asynchronous transfer mode (ATM), wireless application protocol (WAP), socket connection (e.g., secure sockets layer (SSL)), Ethernet, frame relay, and the like, to connect STBs 101a-101n to various sources of media content and devices capable of remotely managing STBs 101a-101n.

Although depicted in FIG. 1 as separate networks, packet-based network 109 and/or telephony network 111 may be completely or partially contained within service provider network 103. For example, service provider network 103 may include facilities to provide for transport of packet-based and/or telephony communications.

By way of example, STB 101a-101n, as well as terminal(s) 107, can remotely access, via a communication interface (not illustrated), server 105 which is configured to execute multiple instances of a remote application 113a utilizing, for instance, one or more processors (not illustrated). That is, remote application 113a may be provided in a distributed fashion using, for instance, client-server architectures, such as implemented by enterprise application service providers (ASP). It is noted that ASP models (and other like architectures) offer system scalability in terms of administrative scalability, geographic scalability, and/or load scalability. Thus, distributed environments are attractive modes for disseminating system 100 functionality to a broad spectrum of users and devices.

For example, server 105 can be an "online" system capable of communicating with one or more third-party web servers (not illustrated), content repositories (e.g., repository 121), or equivalent facilities, to provide users various avenues to draw media content from, as well as control and configure STBs 101a-101n (or subscription services) from a remote location having connectivity to system 100. More specifically, one or more servers 105 may include one or more processors configured to receive one or more commands from one or more end terminals 107 (e.g., a PC) for controlling one or more STBs 101a-101n, wherein the server(s), via the processor(s), are capable of configuring the STB(s) 101a-101n according to the received command(s). In particular embodiments, this configuration can be performed in real-time, wherein commands transmitted to STBs 101a-101n directly effect configuration data stored in a memory of the respective media-based devices 101a-101n.

Additionally (or alternatively), server(s) 105 can access a shared memory, such as repository 127, wherein STBs 101a-101n obtain configuration data from the shared memory, either in real-time or periodically.

As such, exemplary embodiments of remote application 113a may, for instance, comprise hypertext markup language (HTML) user interfaces or JAVA™ applets stored on server 105 and accessed via world-wide-web pages. Further, by enabling access and control of STBs 101a-101n over one or more data networks (e.g., network 103, 109, or 111) using a "web paradigm," server 105 provides users with a convenient and efficient manner for configuring the devices 101a-101n. Further, remote applications 113a-113c may port local control interfaces typically utilized on stand-alone STBs to enable control input in a context consumers are increasing becoming familiar with due to the growing popularity of the Internet. These interlaces are particularly useful in extending system 100 functionality to devices having limited resources (e.g., PDAs, handsets, thin-clients, etc.), as well as providing scalable solutions to varied devices without necessitating intensive high-end costs associated with independent design, tooling, and manufacturing. In alternative embodiments, server 105 is collocated with and/or integrated into MSP 117. As such, multiple users, interfaces, and instances of remote application 113a can be simultaneously realized through system 100.

In one embodiment, STBs 101a-101n, end terminal(s) 107, and/or remote applications 113a-113c may periodically establish a connection with one or more networks (e.g., networks 103, 109, or 111) and/or one or more repositories (e.g., repository 127) to "push" and "pull" control commands and configuration information, such as in a "batched" processing mode. That is, a user interface of STBs 101a-101n may be virtualized over a networked connection. In another embodiment, these components may initiate peer-to-peer communications such that control input and configuration updates governing the STBs 101a-101n are executed "on-the-fly," i.e., in real-time, thus, enabling substantially instantaneous results.

In the example of FIG. 1, STBs 101a-101n are located at one or more user premises (e.g., user premise 119), and geospatially associated with one or more regions. Further, the STBs 101a-101n are logically associated into one or more workgroups (e.g., workgroup 115), wherein a user may configure a plurality of STBs 101a-101n arranged into the workgroup 115 in one or more sessions, from substantially anywhere, utilizing one or more end terminals 107 or STBs (e.g., STB 101n).

For example, a learning institution (such as a secondary school) can distribute a plurality of STBs (e.g., STBs 101a and 101b) throughout various classrooms for extending media content to an attending student body. An administrator (e.g., a principal) may control and configure the plurality of STBs, via an end terminal 107 (e.g., a PC in the principal's office) or at an associated STB (e.g., STB 101b) executing a remote application (e.g., remote applications 113a-113c), so as to select and disseminate educational programming (e.g., a VOD documentary on social awareness) to the students, in real-time. Further, students maybe issued (or personally own) an STB at their home, e.g., STB 101n. As such, an authorized administrator can logically join STBs 101a-101n to workgroup 115, wherein the plurality of STBs 101a-101n may be controlled and configured to present the educational programming to an entire student body. In other words, if certain students were unable to attend school on presentation day, the administrator could simultaneously configure STBs 101a-101n to present the media content so that no student would be deprived of a learning opportunity. If, for instance, the documentary was a live-broadcast extending beyond an allocated time period, the administrator may, via remote application (e.g., remote applications 113a-113c), command one or more STBs (e.g., STB 101b) to record the content for later sessions. In this manner, the administrator may also provide on-demand access to the programming (or recording), wherein certain students may be given authorization to review the material later, via STBs 101a-101n or an end terminal 107 capable of processing audio and/or video signals. As such, STBs 101a-101n may be associated with one or more subscribers, may be located in one or more user premises 119, and/or may be situated in different physical locations, but nevertheless, may be configured as an entity, from substantially anywhere, utilizing one or more end terminals 107 (or STBs 101a-101n) having connectivity to system 100.

Thus, STBs 101a-101n can be configured to communicate with and receive signals and/or data streams from a MSP 117 (or other transmission facility, such as server 105) in response to processes of one or more remote applications 113a-113c. These signals include media content and conventional AV-broadcast content, as well as control commands transmitted over a data network (e.g., service provider network 103, packet-based network 109, and/or telephony network 111). To this effect, MSP 117 can include one or more media content servers (not illustrated) and/or data repositories (not shown). Alternatively, user profile repository 127, content repository 121, or server 105 may be accessed via one or more service provider networks 103 and/or packet-based networks 109. Further, service provider network 103 may include a system administrator (not shown) for operational and management functions to deploy the remote management service using, for instance, an IPTV system. In this manner, STBs 101a-101n can utilize any suitable technology to draw, receive, and/or transmit media content and control signals from/to an MSP 117 or other source/sink (e.g., server 105). A more detailed explanation or an exemplary STB is provided with respect to FIG. 2.

In an exemplary embodiment, STBs 101a-101m can draw, receive, and/or transmit content and control commands from (or to) multiple sources/sinks, thereby alleviating the burden on any single entity, e.g., MSP 117, to meet the content and control demands of any user or premise. Thus, particular embodiments enable authenticated third-party television broadcast systems 123, third-party content provider systems 125, and servers (e.g., server 105) to transmit media content and/or control commands to STBs 101a-101n either apart from, or in conjunction with, MSP 117. The media content and/or the control commands may be distinguished (or otherwise categorized) utilizing metadata included therewith or appended thereto. Metadata can be generally considered data about data; but more specifically, it can be utilized to describe all aspects of, and media content or control command distributed by, system 100. Namely, metadata can include descriptions about: data aspects (file name, type, administrator, size, location, version, or include timestamps, mode bits, arbitrary attribute-value pairs, etc.), titles, activities/events, individuals and organizations involved, intended audiences (e.g., ethnicities, ages, genders, incomes, educational levels, disabilities, mobilities, as well as other like demographic statistics), geospatial identifications (intended zip codes, school districts, communities, etc.), locations of supplementary information and processes, access methods, limitations, timing of activities/events (e.g., start/end dates), as well as motivations, policies and rules. As such, metadata may be utilized by various components of system 100 for control or guiding purposes.

In certain embodiments, system 100 may structure and encode metadata to describe characteristics of the content-bearing entities to aid in the identification, discovery, assessment, and management of the media content by remote applications 113a-113c. For example, the metadata can be used to optimize compression algorithms or perform other computational tasks by the components of system 100. The metadata might be utilized to generate and/or transmit control commands to a plurality of STBs 101a-101n. Various other embodiments might use metadata to suggest media content sources of interest to a user based on information stored in a user profile. In still further embodiments, metadata can be utilized to describe control parameters governing STBs 101a-101n and or subscription services. A more detailed explanation of user profiles is provided with respect to FIG. 2.

In various embodiments, the service provider network 103 may include one or more video and/or audio, as well as control command, processing modules (not shown) for acquiring, generating, and/or transmitting content feeds and/or control commands from MSP 117, the television broadcast systems 123, the third-party content provider systems 125, servers 105, end terminals 107, or STBs 101a-101n, over one or more of the networks 103, 109, 111, to particular STBs 101a-101n. Accordingly, service provider network 103 may include facilities to support compression/decompression, coding/decoding, modulation/demodulation, optical/electrical conversion, and analog/digital conversion, as well as any other suitable signal processing and/or transmission operation. Further, service provider network 103 can optionally support end-to-end data encryption in conjunction with media content streaming and remote access services such that only authorized users are able to experience content, remotely control one or more STBs, and/or interact with other legitimate users/components of system 100.

Accordingly, system 100 may include an authentication module (not shown) configured to perform authorization/authentication services and determine whether users are indeed subscribers to the remote management service. An authentication schema may require a user name and password, a key access number, a unique machine identifier (e.g., media access control (MAC) address), etc., as well as a combination thereof. Once a subscriber has authenticated a presence on system 100, the user may bypass additional authentication procedures for executing later applications (e.g., media content streaming instances and/or control command sessions). Data packets, such as cookies, may be utilized for this purpose. Thus, once an STB or content source is authenticated, connections between the STBs 101a-101n and the end terminal(s) 107 may be established directly or through server 105 and/or MSP 117.

In other embodiments, authentication procedures on a first device (e.g., STB 101a) may identify and authenticate a second device (e.g., terminal 107) and/or third device (STB 101b-101n) communicatively coupled to, or associated with, the first device. Further, the authentication module may grant users the right to control one or more STBs serviced by service provider network 103 by revoking existing sets of digital certificates associated with a STB/end terminal, and issuing new sets of digital certificates mapped to a second STB/end terminal. In this regard, subscribers may start a new control sessions, whereas the previous session may be automatically closed when the "old" or prior certificates associated with the first session are revoked. This enables users to initiate secure sessions at any given end terminal 107 (or STB 101a-101n) linked to system 100, whether or not the end terminal (or STB) belongs to that individual user. It is additionally contemplated that multiple rights sessions may exist concurrently.

While system 100 is illustrated in FIG. 1, the exemplary components are not intended to be limiting, and indeed, additional or alternative components and/or implementations may be utilized.

Figure 2:
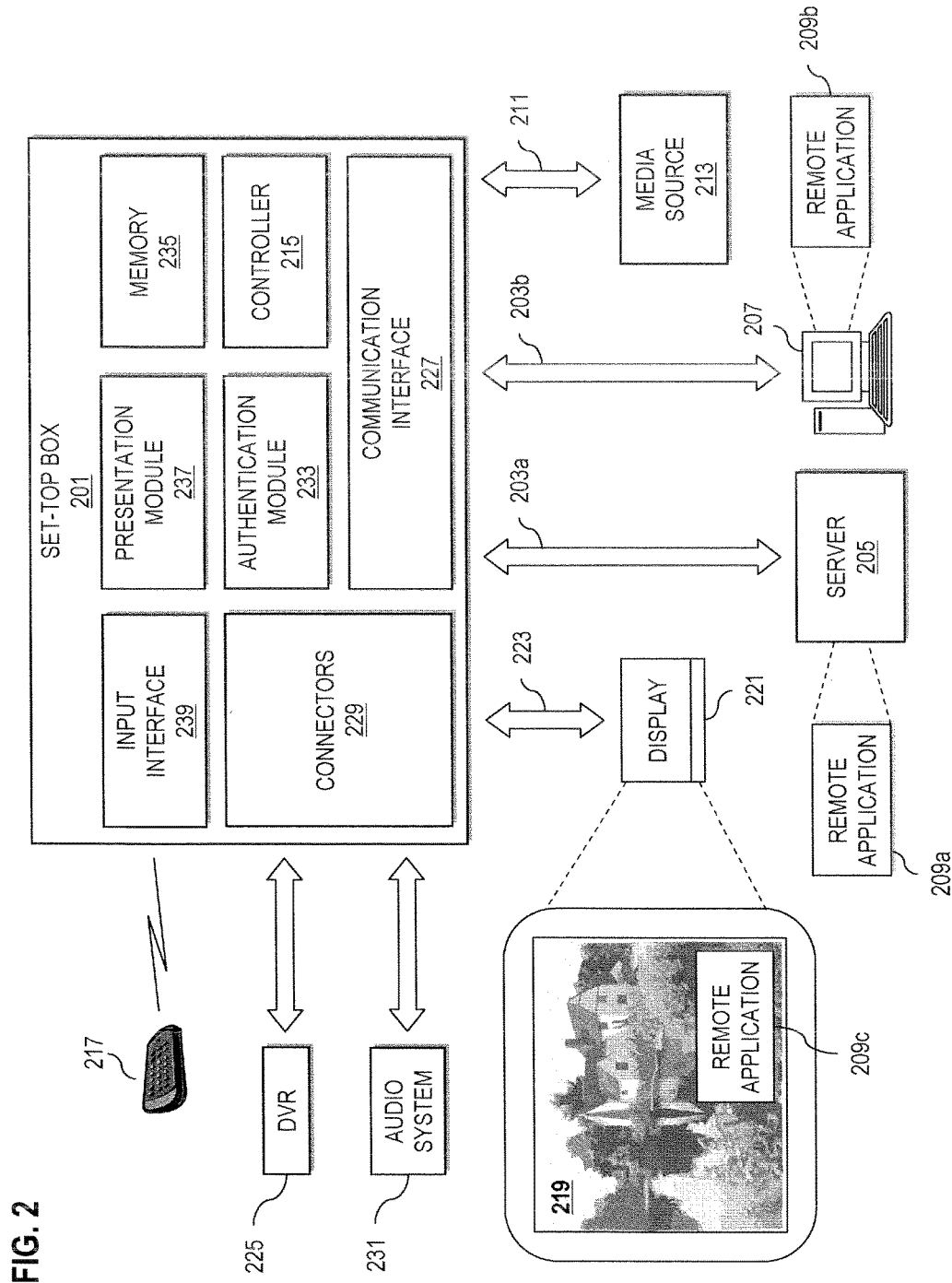
FIG. 2 is a diagram of a set-top box capable of being remotely managed in real-time, according to an exemplary embodiment.

FIG. 2 is a diagram of a set-top box capable of being remotely managed in real-time, according to an exemplary embodiment. STB 201 may comprise any suitable technology to receive one or more control commands (e.g., signals 203a and 203b) from a sever 205 and/or an end terminal 207, as well as from another STB (e.g., STB 101n). As such, STB 201 can generate a command for controlling a plurality of STBs (e.g., STBs 101a-101n) and can transmit the command to STBs 101a-101n for configuring the devices. The control commands include output from one or more remote applications 209a-209c for configuring a plurality of STBs, wherein the configuration may be performed "on-the-fly," i.e., in real-time, or as the result of a "batched" request, i.e., periodically. STB 201 may further comprise suitable technology to receive one or more content streams 211 from a media source 213, such as the IPTV system of FIG. 1. The content stream 211 may be received in response to command(s) from remote application(s) 209a-209c.

Accordingly STB 201 may comprise computing hardware (such as described with respect to FIG. 7) and include additional components configured to provide specialized services related to the generation, transmission, reception, and display of control commands and media content (e.g., remote control capabilities, conditional access functions, tuning functions, presentation functions, multiple network interfaces, AV signal ports, etc.). Alternatively, the functions and operations of STB 201 may be governed by a controller 215 that interacts with each of the STB components to configure STB 201 in response to control commands from remote applications 209a-209c, as well as provide media content retrieved from media source 213. Additionally, a user may be afforded conventional control capabilities utilizing a control device 217.

As such, SIB 201 may be configured to process data streams (e.g., streams 203a, 203b, and 211), including causing a remote application 209c and/or one or more components of received media content (e.g., video component 219 and/or an audio component) to be presented on (or at) display 221. Presentation of the media content may be in response to a command received from one or more remote applications 209a-209c and include: displaying, recording, playing, rewinding, forwarding, toggling, selecting, zooming, or any other processing technique that enables users to experience media content. For instance, STB 201 may provide one or more signals 223 to a display 221 (e.g., television) so that the display 223 may present (e.g., display) remote application 209c overlaid on the media content (e.g., video 219) to a user, wherein the remote application 209c enables users to generate and transmit a command for controlling and/or configuring a plurality of STBs (e.g., STBs 101a-101n). Alternatively, signals 223 may be configured and provided to display 221 in response to a received control command from a remote application(s) 209a-209c.

STB 201 may also interact with a PVR, such as digital video recorder (DVR) 225, to store received media content that can then be manipulated by a user at a later point in time. In various embodiments, DVR 225 may be network-based, e.g., included as a part of the service provider network 103, collocated at a subscriber site having connectivity to STB 201 and/or integrated into STB 201. In any case, remote applications 209a-209c may port control interfaces provided by DVR 225 to enable further user controllability, such as providing recording functions specifying a list of content to be recorded by DVR 225 and/or STB 201. A display 221 may present content provided via STB 201 to a user. In alternative embodiments, STB 201 may be configured to communicate with a number of additional peripheral devices, including: PCs, laptops, PDAs, cellular phones, monitors, mobile devices, handheld devices, as well as any other equivalent technology capable of presenting content to a user, such as those computing, telephony, and mobile apparatuses described with respect to FIG. 1.

These peripherals may be configured to access content stored and/or processed by STB 201 in response to control commands from remote applications 209a-209c. For example, a media content stream 211 may be received by STB 201 and recorded by DVR 225 as the result of a received command from remote application 209a, wherein a PC may later access and view the stored content. Moreover, the peripheral devices may be configured to implement instances of a remote application (e.g., remote application 209b) to control, configure or otherwise program the options and/or functions of STB 201. For instance, a remote application 209b executed on end terminal 207 may receive input from a user specifying VOD content to make available via STB 201. An associated control command, generated based on the input, may be received at communication interface 227, wherein STB 201 retrieves the VOD content for presentation to the user via display 221. In another embodiment, a communication interface (not illustrated) of end terminal 207 may be configured to retrieve the VOD content over, for instance, a data network (e.g., packet-based network 105), wherein STB 201 may receive a data stream 203b from end terminal 207 including the retrieved content and a control command(s) to present the media content to the user via display 221.

In another embodiment, user input to STB 201 and/or a peripheral device (e.g., end terminal 207) executing an instance of a remote application (e.g., remote application 209c and/or 209b) may cause specified media content (e.g., a VOD program) to be made available at another STB (e.g., STB 101a-101n) or a computing, telephony, or mobile device capable of processing audio and/or video streams, Still further, user input to a network-based remote application 209a, implemented on, for instance, server 205, may be configured to program or otherwise control the options and/or functions of STB 201. For instance, a user may access remote application 209a via an end terminal 107, over one or more data networks (e.g., network 103, 109, and/or 111), to transmit commands to configure STB 201 such that a list of content (e.g., live programming) may be recorded by STB 201 and/or DVR 225. In this manner, server 205 (or other component of system 100, such as MSP 117) may, when suitable, transmit the specified media content as a part of stream 203a to STB 201 for presentation at display 221.

Communication interface 227 may be configured to receive control commands from server 205, end terminal 207, MSP 117, or another STB (e.g., STB 101a). In turn, content streams from a media source 213 (e.g., MSP 117, television broadcast system 123, content provider system 125, and/or repository 121), an end terminal 207, and/or server 205 may also be received at communication interface 227. In particular embodiments, communication interface 227 may optionally include single or multiple port interfaces. For example, STB 201 may establish a broadband connection to multiple sources transmitting data to STB 201 via a single port, whereas in alternative embodiments, multiple ports may be assigned to the one or more sources. In still other embodiments, communication interface 227 may transmit control commands so as to configure a plurality of STBs 101a-101n. Further, communication interface 227 may be configured to permit users, via STB 201, to transmit other data (e.g., media content, communications, etc.) to other users with STBs, an MSP 117, or any other suitable source/sink, such as end terminal 207.

According to various embodiments, STB 201 may also include inputs/outputs (e.g., connectors 229) to display 221 and DVR 225, as well as an audio system 231. In particular, audio system 231 may comprise a conventional AV receiver capable of monaural or stereo sound, as well as multichannel surround sound. Audio system 231 may include speakers, ear buds, headphones, or any other suitable component configured for personal or public dissemination. As such, STB 201, display 221, DVR 225, and audio system 231, for example, may support high resolution audio and/or video streams, such as high definition television (HDTV) or digital theater systems high definition (DTS-HD) audio. Thus, STB 201 may be configured to encapsulate data into a proper format with required credentials before transmitting onto one or more of the networks of FIG. 1 and de-encapsulate incoming traffic to dispatch data to display 221 and/or audio system 231.

In an exemplary embodiment, display 221 and/or audio system 231 may be configured with IP capability (i.e., include an IP stack, or otherwise made network addressable), such that the functions of STB 201 may be assumed by display 221 and/or audio system 231 and control/configured by remote application(s) 209a-209c. In this manner, an IP ready, HDTV display or DTS-HD audio system may be directly connected to one or more service provider networks 103, packet-based networks 109, and/or telephony networks 111. Although STB 201, display 221, DVR 225, and audio system 231 are shown separately, it is contemplated that these components may be integrated into a single component, or other combination of components.

An authentication module 233 may be provided at STB 201 to initiate or respond to authentication schemes of, for instance, service provider network 103 or various other content providers, e.g., broadcast television systems 123, third-party content provider systems 125, or servers 105. Authentication module 233 may provide sufficient authentication information, e.g., a user name and password, a key access number, a unique machine identifier (e.g., MAC address), and the like, as well as combinations thereof, to a corresponding network interface for establishing connectivity. As described earlier, one or more digital certificates may be simultaneously mapped. Moreover, authentication at STB 201 may identify and authenticate a second device (e.g., end terminal 207) communicatively coupled to, or associated with, STB 201, or vice versa. Further, authentication information may be stored locally at memory 235, in a repository (not shown) connected to STB 201, or at a remote repository, e.g., user profile repository 127.

Authentication module 233 may also facilitate the reception of data from single or disparate sources. For instance, STB 201 may receive broadcast video from a first source (e.g., IPTV system 117), signals from a remote application at second source (e.g., server 105), and a media content stream from a third source accessible over a data network (e.g., content repository 121). As such, display 221 may present the broadcast video, remote application, and media content stream to the user, wherein STB 201 (in conjunction with one or more remote application(s) 205*a*-205*c*) can permit users to control and configure STB 201, as well as experience various sources of media content available via system 100. This presentation may be experienced separately, concurrently, in a toggled fashion, or with zooming, maximizing, minimizing, or trick capabilities, or equivalent mode. In other exemplary embodiments, authentication module 233 can authenticate a user to allow them to control and configure other STBs (e.g., STB 103*a*-103*n*) and/or subscription services.

A presentation module 237 may be configured to receive data streams 203*a*, 203*b*, and -211 (e.g., AV feed(s) and/or control commands) and output a result via one or more connectors 229 to display 221 and/or audio system 231. In this manner, presentation module 237 may also provide a user interface for remote application 209*c* via display 221. Aural aspects of remote application 209*c* may be presented via audio system 231 and/or display 221. In certain embodiments, remote application 209*c* may be overlaid on the video content output 219 of display 221 via presentation module 237. In any case, however, the data streams may include content received in response to user commands specifying: broadcast channels to be made available, a list of media content to be recorded, an on-demand program (e.g., VOD, AOD, etc.) to be received, or other content available over a data network to be retrieved, such as content from an audio and/or video sharing site.

Connector(s) 229 may provide various physical interfaces to display 221, audio system 231, as well as other peripherals; the physical interfaces may include, for example, RJ45, RJ11, high definition multimedia interface (HDMI), optical, coax, FireWire, wireless, and universal serial bus (USB), or any other suitable connector. The presentation module 237 may also interact with a conventional control device 217 for determining particular media content that a user desires to experience. In an exemplary embodiment, the control device 217 may comprise a remote control (or other access device having control capability, such as end terminal 207, e.g., a PC, wireless device, mobile phone, etc.) that provides a user with the ability to readily manipulate and dynamically change parameters affecting a media content experience. Such parameters can include configuration data, such as parental controls, available channel information, favorite channels specified by the user, program recording settings, viewing history, or loaded software, as well as other suitable control parameters.

In particular embodiments, configuration data may also include channel fixing options, show/hide/label channel functions, making captions or info banners available, label inputs (such as connector(s) 229) options, application graphics settings (e.g., color schemes, icons, etc.), high altitude settings, power saving modes, device password options, country/language options, display settings (e.g., AV parameters), conventional control functions (e.g., channel up/down, input, mute, pause, picture-in-picture, play, power on/off, rewind, fast-forward, record, stop, volume up/down), parental locks, application settings (e.g., memory sticks, i.links, clocks/timers, diagnostics, cable card), change operating system functions, or install software, as well as provide troubleshooting frequently asked questions, get device manuals, or receive safety tips, etc. It is generally noted that configuration data can be any option/feature available at STB 201, DVR 225, or peripheral device (e.g., display 221, audio system 231, control device 217, etc.) having connectivity to (or association with) STB 201.

In this manner, control device 217 and/or end terminal 207 may include (not shown) a cursor controller, trackball, touch screen, touch pad, keyboard, and/or a key pad for activating remote manager applications 209*a*-209*c*, navigating through broadcast channels and/or media content, as well as performing other control functions and configurations. For instance, control device 217 or end terminal 207 may be utilized to maximize a remote application, navigate through displayable interfaces, locate/specify/retrieve media content, modify STB 201 configuration data, or toggle through broadcast channels and/or available media content. Control device 217 or end terminal 207 may also include functional actuators (e.g., buttons, keys, icons, etc.), such as power on/of, play, pause, stop, fast-forward, reverse, volume up/down, channel up/down, menu, ok/enter, record, info, my content, search, edit, or exit, as well as any other suitable control trigger, such as alphanumeric buttons, shift, control, back, symbols, and the like. In other examples, STB 201 may be configured for voice recognition such that STB 201 may be controlled with spoken utterances entered into a remote application.

Further, the control device 217 or end terminal 207 may comprise a memory (not illustrated) for storing preferences (or configuration data) affecting the media content viewed, which can be conveyed to STB 201 through an input interface 239 (or communication interface 227). Input interface 239 may support any type of wired and/or wireless link, e.g., infrared, radio frequency (RF), BLUETOOTH, and the like. Thus, control device 217 and/or end terminal 207 may store user preferences with respect to media content, such as favorite sources, etc., as well as configuration data. Alternatively, user preferences and configuration data may be tracked, recorded, or stored in STB 201, via memory 235, or in a network user profile repository 127. The preferences and configuration data may be automatically retrieved and activated by a user at any time, or may be actuated in response to control commands received via remote applications 209*a*-209*c*. It is noted that control device 217 may be separate from STB 201 or may be integrated within STB 201 (in which case certain input interface hardware and/or software may not be necessary).

Particular embodiments enable users, via one or more remote applications 209*a*-209*c* and control device 217, to populate or otherwise configure a user profile or manage subscription service options. For instance, a user profile function of a remote application(s) 209*a*-209*c* may be provided or accessed by STB 201/end terminal 207 to enable users to populate a plurality of entry fields with user information. A user profile may include one or more customized or personalized settings that affect any aspect of media content accessible via STB 201, configuration parameter of STB 201, or option of a peripheral device. More specifically, the profile may include: subscription information (account number, user name, password, security question, avatar, moniker, etc.), subscriber demographics (age, gender, ethnicity, location of residence, zip code, school district, community, socioeconomic status, religion, marital status, ownerships, languages, mobility, life cycles, etc.), group/organizational affiliations (e.g., political), memberships, interests, buddies, friends, cohorts, system configurations, policies, associated users/devices, etc., as well as any other like personal information.

In other embodiments, profile information can include phone numbers, email addresses, workgroups, viewing history (e.g., current programming, logged history, etc.) account plan, authorized access, billing preferences (e.g., bill receipt options, such as electronic or paper bills, payment methods, such as automatic or manual, etc.), add accounts/users, parental controls, etc. Additionally, a user profile may include a "whitelist" specifying one or more accessible media content sources/subjects, a "blacklist" specifying one or more media content sources/subjects, as well as other equivalent customized settings, such as color schemes, sound effects, etc. Still further, network settings may be affected such as registering associated STBs, DVRs, end terminals, registering premises (e.g., primary residence, vacation cottage, work, etc.), link to content sources (e.g., audio, video, and/or pictographic sites/systems/repositories, etc.), as well as other equivalent parameters.

In other embodiments, the user profile and configuration data may be established, reviewed, and/or modified using the additional access devices described earlier, e.g., end terminal 207, such as a PC, implementing or accessing one or more remote applications 209a-209c. As such, user profile information and configuration data may be stored in STB 201, e.g., in memory 235, and/or at a user site repository (not illustrated) directly connected to STB 201. Additionally or alternatively, this information may be stored in a network-based repository (e.g., remote user profile repository 127), control device 217, and/or any other accessible storage medium, such as a memory stick. Similarly, STB 201 (via memory 235), a user site repository, and/or a network-based repository may store a collection of digital audio, video and/or pictographic content accumulated by a user. This collection may also include a plurality of identifiers (or bookmarks) to media content established via remote application(s) 209a-209c, wherein the selection of a particular identifier may cause the content to be retrieved from an associated link (either directly from a third party source (e.g., television broadcast system 123, content provider system 125, content repository 121, etc.) or indirectly from server 105, MSP 117, end terminal 107, another STB 101a-101n, etc.).

Thus, under arrangements of FIGS. 1 and 2, a user may, in real-time, remotely control and/or configure one or more STBs (e.g., STBs 101a-101n), as well as establish and/or modify a user profile or other subscription service, from any location have connectivity to system 100, via an STB (e.g., 101n), end terminal 107, or server 105 application, at any given point in time. The operation of STB 201 and one or more remote applications 209a-209c, in conjunction with the components of system 100, will now be described with respect to remotely controlling and configuring one or more STBs and one or more subscription service options.

As there may be a relatively large number of configurable parameters available to users, STB 201 may include one or more user interfaces configured to allow subscribers to seamlessly access the configurations and control parameters of one or more STBs 101a-101n and/or related subscription service options, via one or more remote applications 209a-209c. As such, media content may be made available to STBs 101a-101n via the remote applications 209a-209c. It is recognized; however, that one or more user interfaces may be implemented at one or more end terminals 207 or accessible via one or more servers 205 or MSPs 117. Thus, the user interface may be displayed to the user as part of a remote application accessed over a suitable communications link. Namely, web pages may be displayed to the user as part of an online remote application accessed over an Internet communications link. Exemplary processes and user interfaces for those processes are described in more detail with respect to FIGS. 3-6.

Figure 3:
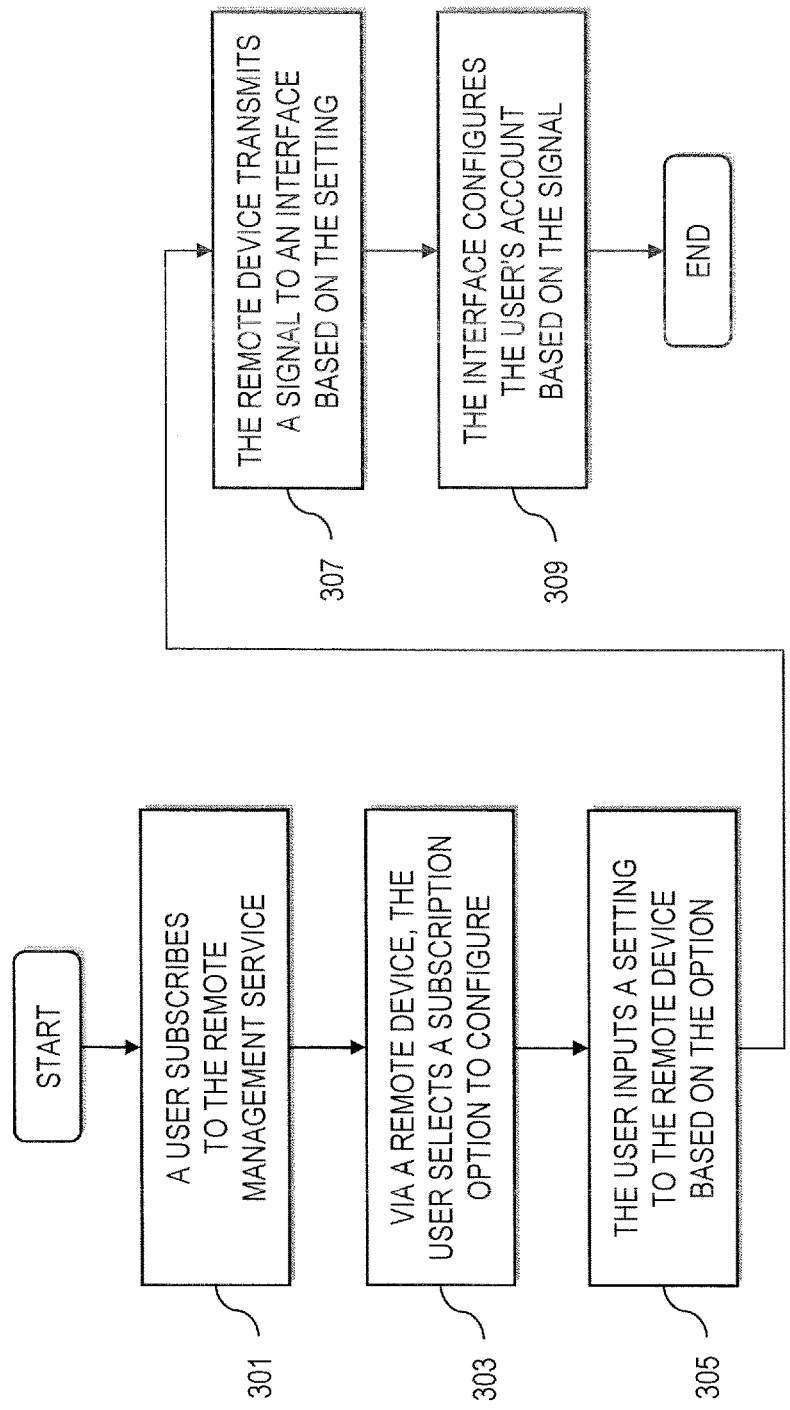
FIG. 3 is a flowchart of a process for remote management of subscription service settings and configurations, according to an exemplary embodiment.

FIG. 3 is a flowchart of a process for remote management of subscription service settings and configurations, according to an exemplary embodiment. This process is described with respect to an exemplary user interface of FIG. 4. In step 301, a new user subscribes to the remote management service utilizing, for instance, an end terminal 207, which is capable of processing and transmitting data over a network (e.g., packet-based network 109). That is, the user may interact with an input interface of end terminal 207 to activate software resident on the device, such as remote application 209b, or web-based remote application 209a implemented on server 205. The software may then establish one or more connections to a service provider network 103 through an IP-based connection. Consequently, the user may register as a new subscriber of the remote management service, as well as obtain sufficient authentication information for establishing future sessions.

In certain embodiments, registration procedures may prompt the user to identify all user devices (e.g., STBs 101a-101n and/or end terminal(s) 107) that the user may employ to interact with system 100 features, e.g., remote applications 209a-209c. The software may automatically search for peripheral devices, e.g. through a pinging or other suitable procedure, as well as port any peripheral configuration parameters or user interface into, for instance, user profile repository 127 for access by remote applications 209a-209c. In other embodiments, the user may identify devices by entering appropriate device information, such as: device type, serial number, registration number, MAC address, phone number, communications link, etc. As such, MSP 117, server 105, and or one or more remote applications 209a-209c may obtain configuration parameters and user interface information from a manufacturer or other third-party supplier over, for instance, the packet-based network 109. Further, when a new device is employed, the software may add the apparatus to the list of user devices associated with the user's account. To this effect, registered devices (such as one or more STBs 101a-101n) may be logically associated with one another. That is, STBs 101a-101n can be grouped into workgroups for controlling a plurality of STBs 101a-101n or associated subscription service options governing the devices and/or services (e.g., available media content).

Once registered and/or authenticated, end terminal 207, via remote application 209a or 209b, may establish communication with MSP 117 for customizing a user profile to embody user-defined attributes, policies, configuration data, premises, and/or workgroups for carrying out functions of system 100. Thus, when the user authenticates a presence via, for instance, an STB 201, the software may provide user-specific interfaces and features based on information stored within the user profile. Moreover, authentication procedures at one device (e.g., end terminal 107) may authenticate other devices (e.g., STBs 101a-101n), as previously described, or vice versa. In other embodiments, users may subscribe to the remote management service and/or populate a user profile via STB 201, utilizing an input interface, such as control device 217 and/or end terminal 207, via remote applications 209c and/or 209a.

After generating a user profile, MSP 117 may store a list of subscribers to the service, as well as a list of subscriber STB identifiers, authentication information, and user-defined profiles (including user-specific policies, subscription service options, and/or configuration data) for one or more STBs 101a-101n and associated peripheral devices (e.g., display 221, audio system 231, etc.). Additionally (or alternatively), users may directly interact with user profile repository 127. Further, user profile information and/or configuration data may be stored within respective user equipment (e.g., STBs 101a-101n). In step 303, the subscriber may interact with, for instance, an input interface of a remotely located end terminal 107 to launch a remote application (e.g., remote application 209a or 209b). Alternatively, the subscriber may launch remote application 209c via, for instance, SIB 101n. The remote application enables the subscriber to select a subscription service option to configure, such as the user profile information or subscription service settings or configurations previously mentioned, from any given location, at any given time, assuming sufficient connectivity to system 100 is made available through one or more end terminals or media-based devices.

Figure 4:
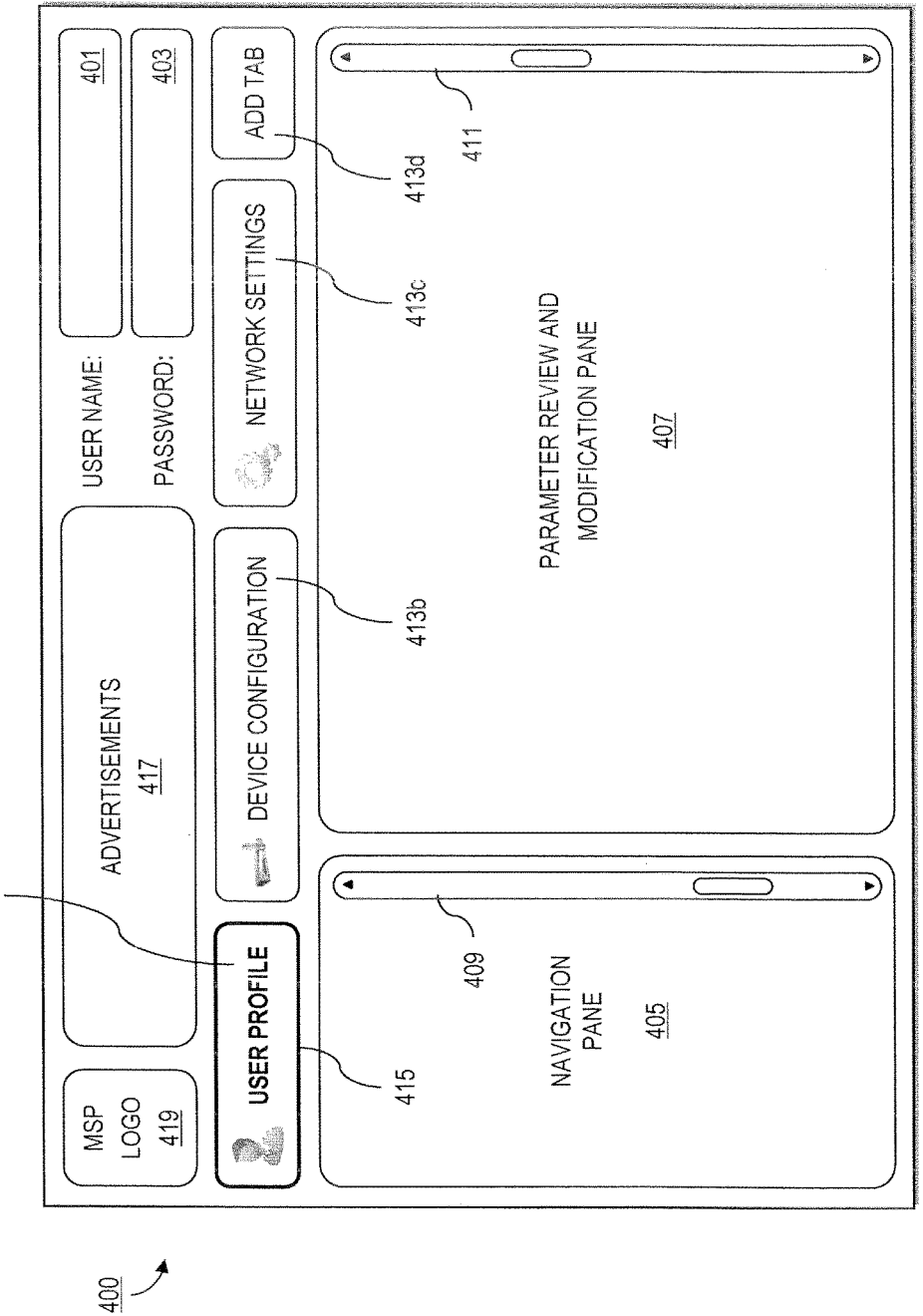
FIG. 4 is a diagram of a user interface utilized in the process of FIG. 3, according to an exemplary embodiment.

As seen in FIG. 4, a user interface 400 is provided, wherein an authenticated subscriber may directly review and modify user profile information and/or network settings (collectively referred to as subscription service options and configurations). User interface 400 may be invoked using a number of different methods. For example, the user may select a dedicated "MENU" button on control device 217 or on a peripheral device communicatively coupled thereto (or associated therewith), such as end terminal 207. It is recognized that any other suitable actuator of these devices may be additionally, or alternatively, used to access the functionality of interface 400, such as triggering a "GUIDE" icon or other suitable graphical element. Further, interface 400 may be evoked by selecting an option within another interface or application (e.g., when navigating from a public screen to a user-specific screen, i.e., a private screen). As such, an executing device (e.g., STB 201, server 205, end terminal 207, etc.) may require sufficient authentication information (e.g., username, password, etc.) to be input in order to access the functions of interface 400. Accordingly, interface 400 includes input fields 401 and 403 for a username and password, respectively. In alternative embodiments, input fields 401 and 403 may be configured to correspond to associated authentication information, such as entering a MAC address and password, etc.

In the illustrated embodiment, user interface 400 may include one or more interactive panes, such as panes 405 and 407. In particular embodiments, as will be described in more detail below, the content of pane 407 may be dynamically updated to display various information related to actions conducted within pane 405, and vice versa. Pane 405 (i.e., a navigation pane) includes a listing of selectable entries corresponding to one or more configurable parameters (or options) that may be associated with a subscription service, such as those parameters previously mentioned. In other embodiments, pane 405 may include a navigation tree, an expandable table of contents, or FlashMedia presentation of selectable entries. Based on a particular selection within pane 405, pane 407 (i.e., a parameter review and modification pane) may be populated with appropriate input fields, selectable elements (e.g., toggle buttons, check boxes, radio buttons, sliders, list boxes, spinners, drop-down lists, menus, toolbars, ribbons, combo boxes, icons, etc.), output fields (e.g., labels, tooltips, balloon helps status bars, progress bars, infobars, etc.) and windows, as well as any other suitable interface widget for inputting (or otherwise perceiving) configurable parameters. In turn, actions within pane 407 may affect selectable parameters within pane 405.

Navigational elements/fields, e.g., scrollbars 409 and 411, as well as tabs 413a-413d, may be provided and configured to indicate the existence of additional entries not displayed, but navigably available, as well as facilitate interface usability. Accordingly, users may browse to these entries via, for instance, an input interface of end terminal 207, e.g., a cursor control. One or more fixed focus states (e.g., border 415) and/or distinctive magnification features, e.g., color, brightness, bolding, font type, text size, etc., may be used to convey a "currently" navigated position or parameter to be entered. In certain embodiments, a plurality of graphical elements may be provided to correspond to the one or more options and/or configurations of the subscription service to aid usability, and thus may be displayed therewith.

In this manner, when a user navigates to a desired entry, actuation of, for instance, a "USER PROFILE" tab 413a or a "NETWORK SETTINGS" tab 413c may launch corresponding subscription service options and configuration fields within panes 405 and 407. In other embodiments, aural descriptions or effects may be provided when a user navigates, for instance, a cursor over particular fields of panes 405 and 407. An "ADD TAB" tab 413d may be provided for users to configure a personalized interface to make particular subscription service options more readily available, such as parental control options or channel availability features. Additionally, interface 400 may be configured to accept verbal commands for entering suitable data into entry fields within pane 407 or making selections within pane 405. In other embodiments, interface 400 may include fields for targeted advertisements 417 generated based on metadata concerning information within a user profile or media content received at one or more STBs 101a-101n, as well as fields for MSP logos 419, or other suitable field. Tab 413b is explained in greater detail with respect to FIGS. 5a-6.

Referring back to FIG. 3, the user may input a setting to the remotely located end terminal 207 for managing subscription service options and configurations, per step 305. In step 307, end terminal 207, via one or more executed remote applications 209a or 209b, may transmit a signal to an interface, e.g., a communication interface, of service provider network 103, server 105, user profile repository 127, etc., based on the user input. More specifically, the transmitted signal may be received at an interface of user profile repository 127 directly or indirectly via an interface of, for instance, MSP 117 or server 105, wherein one or more of these interface (via a processor) can configure the subscription service option and/or configuration parameter based on the received signal. Such configuration may be executed in real-time, thus having substantially immediate effect on the user's account and available media content at STBs 101a-101n.

Figure 5B:
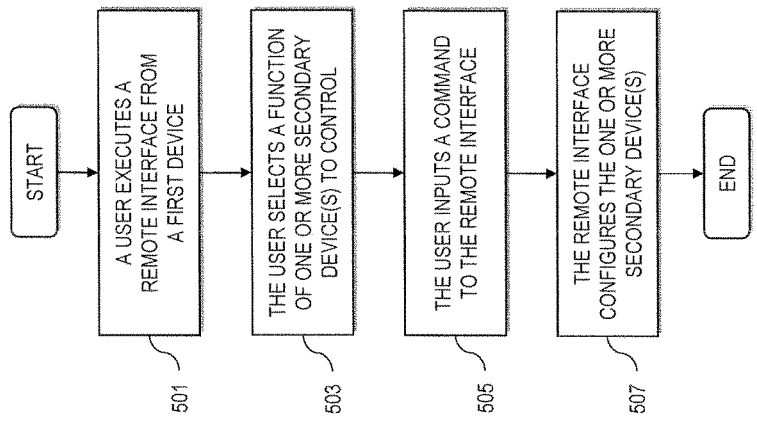
FIGS. 5*a* and 5*b* are flowcharts of processes for remote management of one or more set-top boxes of FIG. 2, according to exemplary embodiments.
Figure 5A:
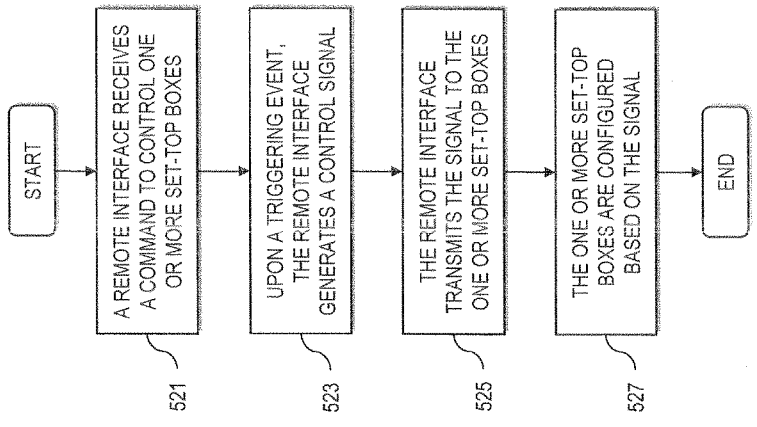
Figure 6:
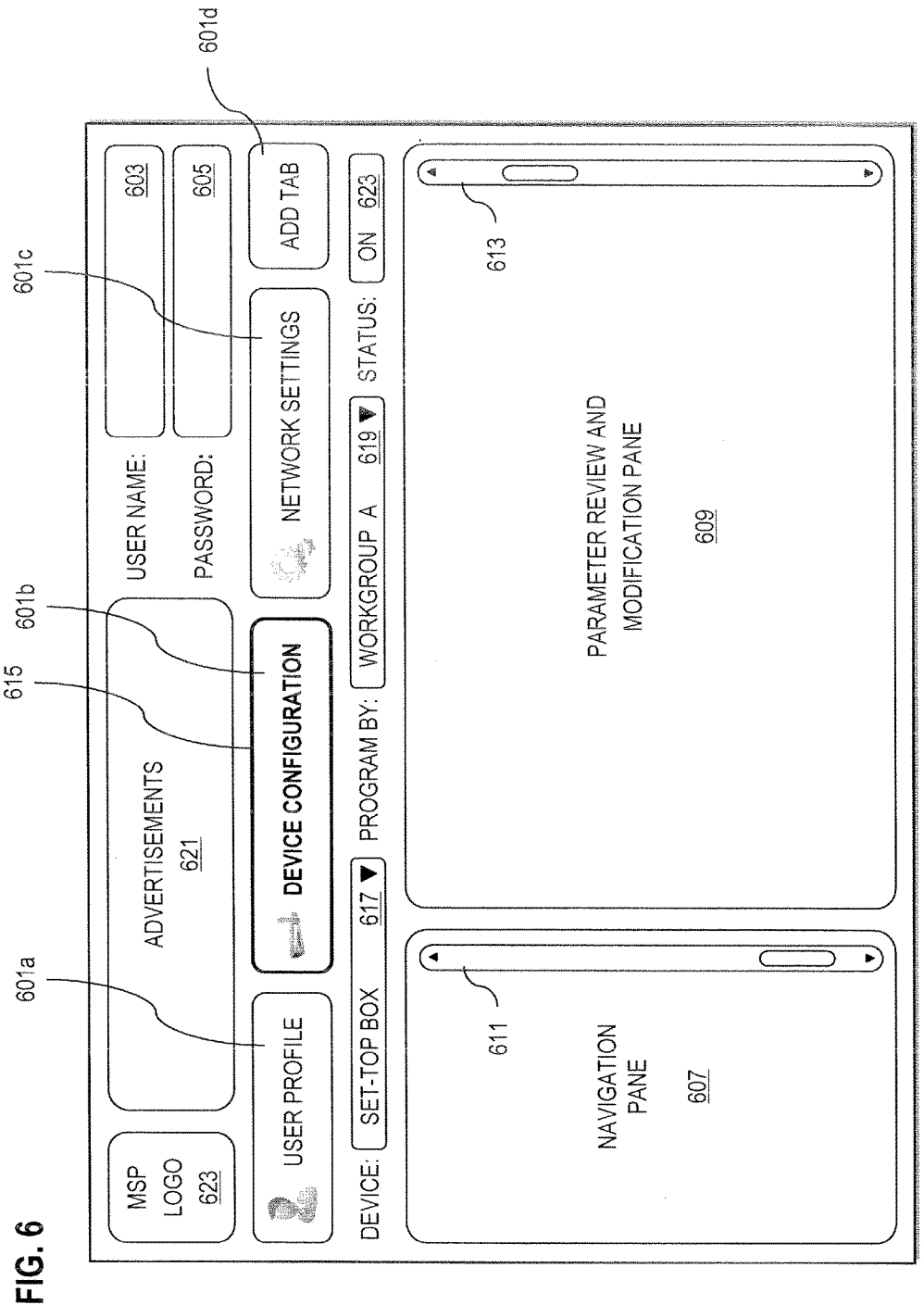
FIG. 6 is a diagram of a user interface utilized in the processes of FIGS. 5*a* and 5*b*, according to an exemplary embodiment.

In some embodiments, one or more remote applications 209a-209c may be utilized to configure a plurality of STBs 101a-101n, either in real-time or periodically. FIGS. 5a and 5b are flowcharts of processes for remote management of one or more set-top boxes of FIG. 2, according to exemplary embodiments. FIG. 6 is a diagram of an exemplary user interface configured for this purpose.

In particular, FIG. 5a illustrates an exemplary process for real-time, remote management of one or more STBs from an end terminal perspective. In step 501, a user executes a remote interface (e.g., remote application 209a executing on server 205) via a first device, such as an end terminal 207. In alternative embodiments, the user may initialize a local, remote application 209b from a remote location, via end terminal 207. Still further, remote application 209c may be implemented on, for instance STB 101n, from a remote location to remotely manage one or more STBs (e.g., STBs 101a-101n).

As previously described, a remote application, e.g., user interface 600, may be evoked using a number of different methods. For example, the user may select a dedicated "MENU" button on control device 217 or on a peripheral device, such as end terminal 207. It is recognized that any other suitable actuator of these devices may be additionally, or alternatively, used to access the functionality of interface 600, such as triggering a "GUIDE" icon or other suitable graphical element. Further, interface 600 may be evoked by selecting an option within another interface or application (e.g., when navigating from a public screen to a user-specific screen, i.e., a private screen, or navigating from interface 400 to interface 600, such as by interacting with tab 413b of interface 400, i.e., tab 601b of interface 600). As such, interface 600 may include input fields 603 and 605 for a username and password, respectively. In alternative embodiments, input fields 603 and 605 may be configured to correspond to associated authentication information, such as entering a MAC address and password, etc. Alternatively, a "WELCOME, USERNAME" message may appear for previously authenticated subscribers.

As seen in FIG. 6, an interface 600 is provided, wherein an authenticated subscriber may directly review and modify device configurations, such as for STBs 201, displays 221, audio systems 231, peripheral devices, etc. As with interface 400, interface 600 may include one or more interactive panes, such as panes 607 and 609, wherein, the content of pane 609 may be dynamically updated to display various information related to actions conducted within pane 607, and vice versa. Pane 607 (i.e., a navigation pane) includes a listing of selectable entries corresponding to one or more configurable parameters (or options/data) that may be associated with a configurable device, such as an STB, wherein the configuration data includes those parameters previously mentioned. In other embodiments, pane 607 may include a navigation tree, an expandable table of contents, or Flash-Media presentation of selectable entries, as well as other equivalent listings. Based on a particular selection within pane 607, pane 609 (i.e., a parameter review and modification pane) may be populated with appropriate input fields, selectable elements, output fields, and windows, as well as any other suitable interface widget for inputting (or otherwise perceiving) configurable parameters, as with pane 407 previously described. In turn, actions within pane 609 may affect selectable parameters within pane 607.

Navigational elements/fields, e.g., scrollbars 611 and 613, as well as tabs 601a-601d, may be provided and configured to indicate the existence of additional entries not displayed, but navigably available, as well as facilitate interface usability. Accordingly, users may browse to these entries via, for instance, an input interface of end terminal 207, e.g., a cursor control. One or more fixed focus states (e.g., border 615) and/or distinctive magnification features, e.g., color, brightness, bolding, font type, text size, etc., may be used to convey a "currently" navigated position or parameter to be entered. In certain embodiments, a plurality of graphical elements may be provided to correspond to the one or more options and/or configurations of the device(s) being configured to aid usability, and thus may be displayed therewith.

In this manner, when a user navigates to a desired entry, actuation of, for instance, a "DEVICE CONFIGURATION" tab 601b may launch corresponding configuration data, fields within panes 607 and 609. Further, a drop-down list field 617 may be provided for selecting a particular device to configure, e.g., "STB." Also, a drop-down list field 619 may permit users to program, configure, or otherwise control particular workgroups of devices, such as "WORKGROUP A," e.g., workgroup 115 comprising STBs 101a-101n. To this effect, authorized subscribers may configure a plurality of media-based devices from a single, remote location, at any given point in time. These devices may be associated with the controlling subscriber, or may be associated with one or more other subscribers. Further, the devices may be situated in different physical locations, or disseminated among one or more user premises.

In other embodiments, aural descriptions or effects may be provided when a user navigates, for instance, a cursor over particular fields of panes 607 and 609, as well as drop-down lists 617 and 619. An "ADD TAB" tab 601d may be provided for users to configure a personalized interface to make particular device configurations more readily available, such as parental control options, available channel options, favorite channel specifications, program recording settings, viewing history, software loaded on a device, as well as other suitable parameters. Moreover, interface 600 may be configured to accept verbal commands for entering suitable data into entry fields within pane 609 or making selections within pane 607 or from drop-down lists 617 and 619. In other embodiments, interface 600 may include fields for targeted advertisements 621 generated based on meta-data concerning information within a user profile or media content received at one or more STBs 101a-101n, as well as fields for MSP logos 623, or other suitable field. Further, interface 600 may include a status field 625 for ascertaining the state of one or more STBs 101a-101n. For instance, interaction with field 625 may provide a powering state (e.g., on/off), current programming being experienced, whether a device is currently recording a program, etc.

Referring back to FIG. 5a, the user (per step 503) may select (from pane 607) a function governing one or more secondary device(s), e.g., STBs 101a-101n, to control and/or configure. Doing so may dynamically modify pane 609 to present various input fields, selectable elements, output fields, windows, etc., for configuring the one or more STBs 101a-101n. At step 505, the user can input a command to the remote interface, e.g., remote application 209c, via an input interface of, for instance, end terminal 207. In response to the user input, the remote application 209c, via a processor, may generate one or more commands for controlling the plurality of STBs 101a-101n, and transmit the command to the STBs 101a-101n to configure the devices 101a-101n. Accordingly, the transmitted command may seamlessly configure, in real-time, the one or more secondary device(s) located at a remote location, per step 507.

In alternative embodiments, a user at a remote end terminal 207, via remote application 209b, may effectuate the process of FIG. 5a, either directly or indirectly via server 105 and/or MSP 117. Still further, a subscriber may execute the process of FIG. 5a via a remote STB (e.g., STB 101n), implementing a local, remote application 113c, remote application 113b, or remote applications 113a. As such, system 100 components are capable of peer-to-peer connections facilitated via server 105 or MSP 117, as well as routing communications through these centralized components. In any event, the configuration process may be conducted in real-time, thus having substantially immediate effect.

For instance, a subscriber to the remote management service may receive a phone call at work from his children (at home) asking whether they may watch a certain VOD program they just viewed in a commercial. The subscriber may access an online remote application 209a available via server 105 over packet-based network 109 (e.g., the Internet), using for instance a first end terminal 107 (e.g., a PC). As such, the user may implement the process of FIG. 5a utilizing interface 600 of FIG. 6 to specify a VOD selection requested by the children. Upon entering the selection, the user may also select certain STBs 101a and 101b from which the children may experience the program, i.e., STBs located at the respective children's rooms, and limit access to other STBs (e.g., STB 101*n*), such as an STB in the subscriber's personal room.

Accordingly, remote application 209*a* may generate one or more control commands, transmit those commands to STBs 101*a*-101*n*, wherein the devices may be configured according to the commands. As such, the children will be able to immediately experience the VOD program instead of having to wait until their parent arrives home from work to manipulate one or more STBs to acquire the media content. Further, the subscriber may later, at a second end terminal 107 (e.g., a mobile handset) remotely access a remote application (e.g., remote application 209*a*) to ascertain the state of the programmed STBs 101*a*-101*n* via status field 625 of interface 600. In this manner, the subscriber may determine whether or not the children are still watching the program, etc.

FIG. 5*b* illustrates an exemplary process for scheduled remote management of one or more STBs from a remote interface(s), e.g., remote application(s), perspective(s). In step 521, a remote interface, e.g., remote application 209*a*, receives a command to control one or more STBs from an authenticated user at an end terminal 207. Pane 609 of interface 600 may be utilized for this purpose. In this example, however, the subscriber may input a control schedule. For instance, a user at work may execute one or more remote applications, e.g., remote application 209*b*, via an end terminal 207, such as a mobile handset. To this effect, remote application 209*b* may be a thin-client version or a fully functional version of, for instance, remote application 209*a*.

Remote application 209*b* includes a user interface 600 with a recording function instance. Accordingly, the user via panes 607 and 609 may specify a list of content to be recorded by one or more STBs 101*a*-101*n*, at for instance, his home and vacation cottage. The list of content may include programs currently available or will be made available sometime in the future. As such, the user may specify conventional recording commands (e.g., date, time, duration, channel, etc.) of the specified programming or may simply specify media content parameters (e.g., title, actors, producer, etc.) wherein the remote application 209*b* may request sufficient media content from server 105, MSP 117, and/or third party sources (e.g., television broadcast systems 123, content provider systems 125, content repository 121, etc.) to satisfy the request.

In certain embodiments, remote application 209*b* may enable subscribers to search for content to be recorded, such as search by keyword (e.g., actor, program title, publication date/time, program description, genre, rating, or any other suitable search string), or search by content type (e.g., media content taking the form of audio streams, video streams, pictographic content, etc.), as well as any other suitable search option. In other embodiments, various search options may be combined or strung together by logical operators/connectors, e.g., and, or, not, etc. Thus, search options may allow users to perform complex (or Boolean) searches. Still further, users can implement third party search engines accessible over a data network, e.g., Google, wherein corresponding search results may be automatically ported to the remote application or simply "copied and pasted" when necessary. In any case, search results may be acquired via metadata correlation, i.e., based on available media content descriptions related to searching parameters.

In step 523, upon a triggering event (i.e., satisfaction of one or more control schedule conditions, such as the content becoming available or the occurrence of a recording command), remote application 209*b* may generate one or more control commands to record one or more content instances from the user specified list, at one or more STBs 101*a*-101*n*. The signal can be transmitted to each of the specified STBs 101*a*-101*n* to record the programming, per step 525. In step 527, the one or more STBs are configured based on the received signal and may effectuate the recording procedure. In other embodiments, subscribers may implement the process of FIG. 5*b* via remote applications 209*a* and/or 209*c* via, for instance, an end terminal 207 and/or an STB (e.g., STB 101*n*).

The processes described herein for remote services management may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
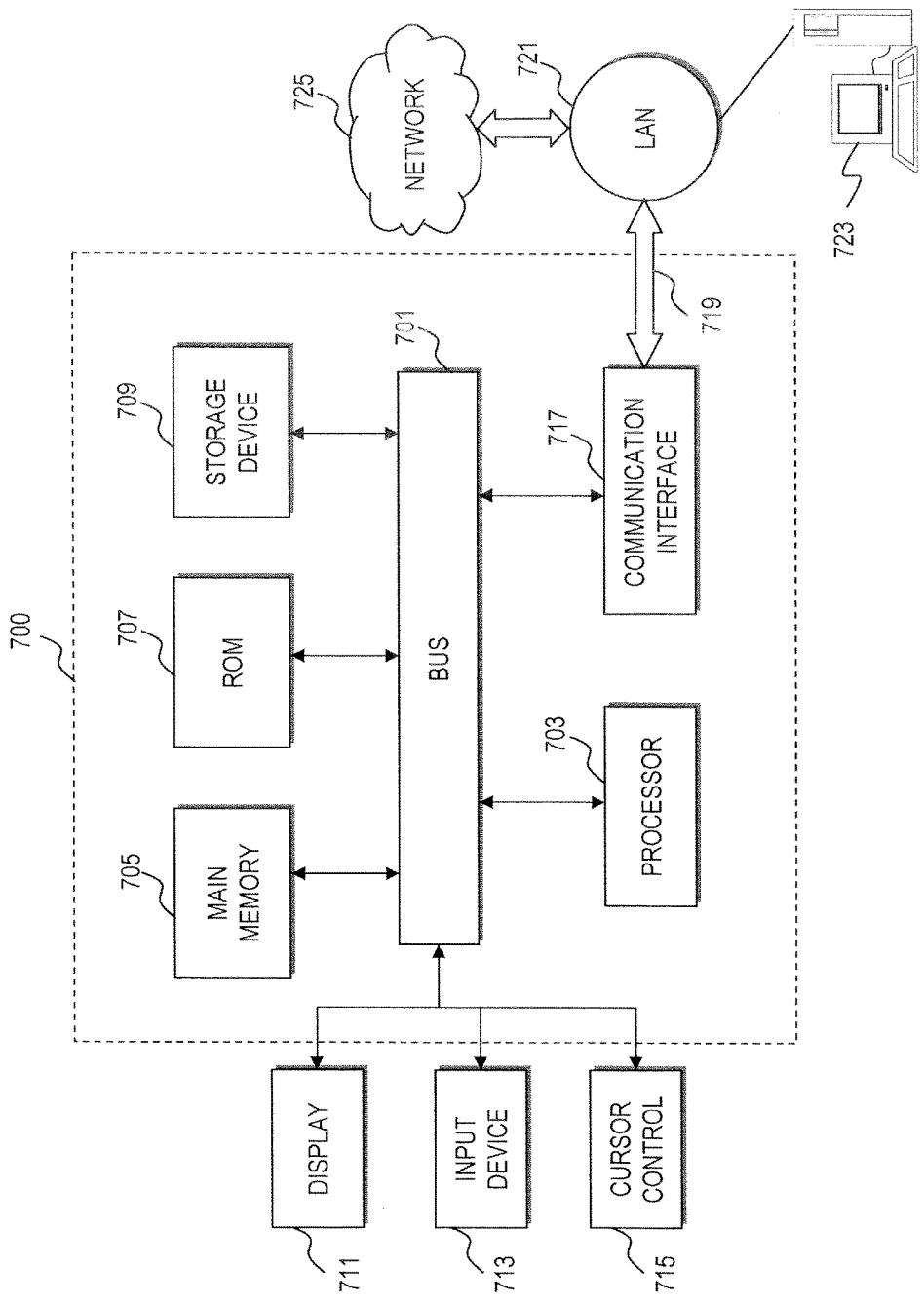
FIG. 7 is a diagram of a computer system that can be used to implement various exemplary embodiments.

FIG. 7 illustrates computing hardware (e.g., computer system) 700 upon which an embodiment according to the invention can be implemented. The computer system 700 includes a bus 701 or other communication mechanism for communicating information and a processor 703 coupled to the bus 701 for processing information. The computer system 700 also includes main memory 705, such as a random access memory (RAM) or other dynamic storage device, coupled to the bus 701 for storing information and instructions to be executed by the processor 703. Main memory 705 can also be used for storing temporary variables or other intermediate information during execution of instructions by the processor 703. The computer system 700 may further include a read only memory (ROM) 707 or other static storage device coupled to the bus 701 for storing static information and instructions for the processor 703. A storage device 709, such as a magnetic disk or optical disk, is coupled to the bus 701 for persistently storing information and instructions.

The computer system 700 may be coupled via the bus 701 to a display 711, such as a cathode ray tube (CRT), liquid crystal display, active matrix display, or plasma display, for displaying information to a computer user. An input device 713, such as a keyboard including alphanumeric and other keys, is coupled to the bus 701 for communicating information and command selections to the processor 703. Another type of user input device is a cursor control 715, such as a mouse, a trackball, or cursor direction keys, for communicating direction information and command selections to the processor 703 and for controlling cursor movement on the display 711.

According to an embodiment of the invention, the processes described herein are performed by the computer system 700, in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of or in combination with software instructions to implement the embodiment of the invention. Thus, embodiments of the invention are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, a telephone modem, or any other communication interface to provide a data communication connection to a corresponding type of communication line. As another example, communication interface 717 may be a local area network (LAN) card (e.g. for Ethernet™ or an Asynchronous Transfer Model (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a PCMCIA (Personal Computer Memory Card International Association) interface, etc. Although a single communication interface 717 is depicted in FIG. 7, multiple communication interfaces can also be employed.

The network link 719 typically provides data communication through one or more networks to other data devices. For example, the network link 719 may provide a connection through local network 721 to a host computer 723, which has connectivity to a network 725 (e.g. a wide area network (WAN) or the global packet data communication network now commonly referred to as the "Internet") or to data equipment operated by a service provider. The local network 721 and the network 725 both use electrical, electromagnetic, or optical signals to convey information and instructions. The signals through the various networks and the signals on the network link 719 and through the communication interface 717, which communicate digital data with the computer system 700, are exemplary forms of carrier waves bearing the information and instructions.

The computer system 700 can send messages and receive data, including program code, through the network(s), the network link 719, and the communication interface 717. In the Internet example, a server (not shown) might transmit requested code belonging to an application program for implementing an embodiment of the invention through the network 725, the local network 721 and the communication interface 717. The processor 703 may execute the transmitted code while being received and/or store the code in the storage device 709, or other non-volatile storage for later execution. In this manner, the computer system 700 may obtain application code in the form of a carrier wave.

The term "computer-readable medium" as used herein refers to any medium that participates in providing instructions to the processor 703 for execution. Such a medium may take many forms, including but not limited to non-volatile media, volatile media, and transmission media. Non-volatile media include, for example, optical or magnetic disks, such as the storage device 709. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or alter execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
maintaining, by a processor, a plurality of accounts to a remote management service for providing remote set-top box configuration;
receiving, by the processor, a command from a computing device for controlling a plurality of set-top boxes, the command corresponding to a single command entered by a user through a user interface of the computing device, a first set-top box included in the plurality of set-top boxes corresponding to a first account included in the plurality of accounts and a second set-top box included in the plurality of set-top boxes corresponding to a second account included in the plurality of accounts, the first account and the second account corresponding to different subscribers;
authenticating the computing device as being associated with the remote management service,
wherein the authentication of the computing device provides for authentication of the plurality of set-top boxes, and each one of the plurality set-top boxes is configured to authenticate any other one of the plurality set-top boxes and/or the computing device; and
concurrently configuring, in response to the received single command entered by the user through the user interface of the computing device, the plurality of set-top boxes including the first set-top box and the second set-top box as a group according to the received single command such that the first set-top box and the second set-top box are configured to separately and independently play back media content associated with the received single command,
wherein the concurrently configuring of the plurality of set-top boxes further comprises configuring, based on a plurality of commands generated in response to the received single command for controlling the plurality of set-top boxes, an account setting of the first set-top box and the second set-top box, the account setting including one or more of a favorite channel setting, a personalization setting, a subscription setting, and software loaded in the first set-top box and the second set-top box.

2. The method according to claim 1, wherein the configuring of the plurality of set-top boxes is performed in real-time.

3. The method according to claim 1, wherein one of the plurality of set-top boxes includes a recording function and the received single command specifies a list of content to be recorded by the one of the plurality of set-top boxes.

4. The method according to claim 1, wherein the computing device executes a web-based application to issue the received single command.

5. The method according to claim 1, wherein the received single command specifies a video-on-demand selection.

6. The method according to claim 1, wherein a user of the computing device utilizes the computing device to manage subscription service for the plurality of set-top boxes.

7. The method according to claim 1, further comprising: storing the account setting within each of the plurality of set-top boxes.

8. The method according to claim 1, wherein the computing device is authenticated using a set-top box that is not associated with the first account or the second account.

9. The method according to claim 1, wherein the plurality of set-top boxes present media content including broadcast programs, video on demand, pay-per-view, IPTV feeds, recorded media content, data communication services content, internet services content, or combination thereof.

10. The method according to claim 1, wherein the received single command is associated with a user input entered through the computing device by the user who is an administrator that is among a plurality of subscribers to the remote management service.

11. The method of claim 1, wherein:
the computing device is located remotely from the plurality of set-top boxes; and
the received single command is associated with a user input entered through the computing device by the user who is a third-party end user that is authorized to concurrently configure the account setting of the first set-top box and the second set-top box.

12. An apparatus comprising:
a processor that,
maintains a plurality of accounts to a remote management service for providing remote set-top box configuration,
receives a command from a computing device for controlling a plurality of set-top boxes, the command corresponding to a single command entered by a user through a user interface of the computing device, a first set-top box included in the plurality of set-top boxes corresponding to a first account included in the plurality of accounts and a second set-top box included in the plurality of set-top boxes corresponding to a second account included in the plurality of accounts, the first account and the second account corresponding to different subscribers, and
authenticates the computing device as being associated with the remote management service,
wherein the authentication of the computing device provides for authentication of the plurality of set-top boxes, and each one of the plurality set-top boxes is configured to authenticate any other one of the plurality set-top boxes and/or the computing device,
wherein the processor further concurrently configures, in response to the received single command entered by the user through the user interface of the computing device, the plurality of set-top boxes including the first set-top box and the second set-top box as a group according to the received single command such that the first set-top box and the second set-top box are configured to separately and independently play back media content associated with the received single command, and
wherein the processor further concurrently configures the plurality of set-top boxes by configuring, based on a plurality of commands generated in response to the received single command for controlling the plurality of set-top boxes, an account setting of the first set-top box and the second set-top box, the account setting including one or more of a favorite channel setting, a personalization setting, a subscription setting, and software loaded in the first set-top box and the second set-top box.

13. The apparatus according to claim 12, wherein the processor configures the plurality of set-top boxes in real-time.

14. The apparatus according to claim 12, wherein one of the plurality of set-top boxes includes a recording function and the received single command specifies a list of content to be recorded by the one of the plurality of set-top boxes.

15. The apparatus according to claim 12, wherein the computing device executes a web-based application to issue the received single command, wherein the received single command specifies a video-on-demand selection.

16. The apparatus according to claim 12, wherein a user of the computing device utilizes the computing device to manage subscription service for the plurality of set-top boxes.

17. The apparatus according to claim 12, further comprising:
a memory that stores the account setting within each of the plurality of set-top boxes.

18. A method comprising:
presenting, via an end terminal, a user interface that permits a subscriber to establish a workgroup of set-top boxes, wherein the subscriber is among a plurality of subscribers to a remote management service;
receiving a single input from the subscriber, via the user interface, to make content located at one or more set-top boxes of the workgroup available at a first set-top box of the workgroup and a second set-top box of the workgroup, the first set-top box and the second set-top box associated with different subscribers among the plurality of subscribers;
requesting authentication of the subscriber via the user interface to the remote management service;
generating a signal for configuring the one or more set-top boxes based on the single input; and
transmitting the signal to the one or more set-top boxes to concurrently configure, in response to the single input received from the subscriber, the one or more set-top boxes including the first set-top box and the second set-top box to make the content located at the one or more set-top boxes available for separate and independent play back by the first set-top box and the second set-top box,
wherein the signal transmitted to the one or more set-top boxes further concurrently configures, based on a plurality of commands generated in response to the single input to make content located at the one or more set-top boxes of the workgroup available at the first set-top box of the workgroup and the second set-top box of the workgroup, an account setting of the first set-top box and the second set-top box, the account setting including one or more of a favorite channel setting, a personalization setting, a subscription setting, and software loaded in the first set-top box and the second set-top box.

19. The method of claim 18, wherein the end terminal is a computing device, a mobile device, a telephony device, or a set-top box of the workgroup.

20. The method of claim 19, wherein the end terminal is remotely located from the workgroup and the first set-top box and the second set-top box are configured, in response to the transmitting of the signal, in substantially real-time.

21. The method of claim 18, wherein the single input effects a service subscription option and the content is an audio on-demand selection or a video on-demand selection.

22. The method of claim 18, wherein the user interface further permits the subscriber to monitor a state of one or more of the set-top boxes of the workgroup.

23. The method according to claim 18, wherein the set-top boxes associated with the workgroup are all configured at once through selection of the workgroup via the user interface.

24. A method comprising:
providing a web-based user interface that permits a user to control a plurality of associated set-top boxes as part of a remote management service, the plurality of associated set-top boxes being associated with one of a plurality of accounts to the remote management service;
receiving an input, via the web-based user interface, from the user specifying content to be recorded by a set-top box within the plurality of associated set-top boxes;
requesting authentication of the user to the remote management service;
configuring the set-top box based on the input and according to a user-defined policy,
wherein the user-defined policy includes a triggering event for recording the content;
making the content recorded by the set-top box available to a first set-top box included in the plurality of associated set-top boxes and corresponding to a first account included in the plurality of accounts and a second set-top box included in the plurality of associated set-top boxes and corresponding to a second account included in the plurality of accounts, the first account and the second account corresponding to different subscribers; and
concurrently configuring, in response to a single command received from the user, the first set-top box and the second set-top box as a group to enable separate and independent on-demand access to the content by the first set-top box and the second set-top box,
wherein the concurrently configuring of the first set-top box and the second set-top box further comprises configuring, based on a plurality of commands generated in response to the single command received from the user to concurrently configure the first set-top box and the second set-top box as a group, an account setting of the first set-top box and the second set-top box, the account setting including one or more of a favorite channel setting, a personalization setting, a subscription setting, and software loaded in the first set-top box and the second set-top box, and
wherein the user-defined policy further defines which other set-top boxes included in the plurality of associated set-top boxes are to have access to the content recorded.

25. The method of claim 24, wherein the triggering event relates to date, time, and duration parameters.

26. The method of claim 24, wherein the triggering event relates to availability of the content.

27. The method of claim 24, wherein user profile information associated with the plurality of associated set-top boxes is modified through the web-based user interface.

28. The method of claim 24, wherein the web-based user interface includes at least one interactive pane, a navigation pane, a parameter review and modification pane, or a combination thereof.

29. The method according to claim 24, further comprising:
communicating directly between a computing device, executing the web-based user interface, and the set-top box over a packet-based network to configure the set-top box.

* * * * *